May 6, 1969  TERUICHI TOMURA  3,443,096
CIRCUIT ARRANGEMENT FOR USE IN RADIATION MEASUREMENTS
AND THE LIKE PURPOSES
Filed Feb. 25, 1965

INVENTOR.
Teruichi Tomura
BY
H. Edward Mastern

United States Patent Office 3,443,096
Patented May 6, 1969

3,443,096
CIRCUIT ARRANGEMENT FOR USE IN RADIATION MEASUREMENTS AND THE LIKE PURPOSES
Teruichi Tomura, Kodaira-shi, Tokyo-to, Japan, assignor to Kabushiki Kaisha Hitachi Seisokusho, Tokyo-to, Japan, a joint-stock company of Japan
Filed Feb. 25, 1965, Ser. No. 435,132
Claims priority, application Japan, Feb. 29, 1964, 11,169, 11,170, 11,171
Int. Cl. H01j 39/00
U.S. Cl. 250—83.3   2 Claims

ABSTRACT OF THE DISCLOSURE

A radiation measuring circuit has a radiation detector with a first group of amplifier and RC coupling circuit; a second group of amplifier and RC coupling circuit for the first RC coupling circuit; a third amplifier for the second RC coupling circuit that includes a direct current coupling arrangement in the main feedback loop, and a pulse height analyzer provided for the output of the third amplifier.

---

This invention relates to a novel circuit arrangement suitable for use in radiation measurements and non-dispersive soft X-ray spectrum analysis and has as its essential object the elimination of variations in the D-C levels of the output pulses.

The invention may be clearly understood from the following description when taken in connection with the accompanying drawings in which like parts are designated by like reference characters, and in which.

As is well known in the art, the electric quantities of outputs of such radiation detectors as proportional counters, scintillation counters and the like are proportional to the radiation energy impinging upon the detectors. Accordingly it is possible to determine the energy spectrum of incident radiations by producing electric pulses proportional to the electric quantity of the output and then supplying the output to a pulse height analyzer. To this end, the so-called pulse height analyzing device comprising a combination of a radiation detector, a pulse amplifier, a pulse height analyzer and the like is usually used.

Figure 6:
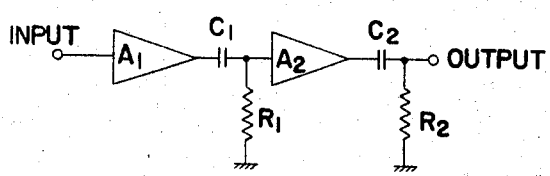
FIG. 6 shows an electric circuit for explaining the principle of this invention.

The time widths of the output electric quantities obtained by said detector are very narrow and are usually concentrated in a range of from 20 to 30 μs., for example. Accordingly, if the output pulses are to be amplified as produced by the detector, it will be necessary to use an amplifier of very broad frequency band width, thus increasing noise. However, as the information to be determined is the incident radiation energy, it is sufficient to know only the integrated electrical quantity of the pulse which is proportional to said radiation energy, and it is not necessary to know its shape with regard to time. Therefore, it is usual to properly integrate and differentiate the output pulses to decrease their band width, then after converting the results in such a manner that said electric output quantity and the output pulse height from said amplifier are proportional, the converted electrical quantity is amplified. Pulse amplifiers $A_1$ and $A_2$ shown in FIG. 6 are generally called linear amplifiers or proportional amplifiers, as is well known by those skilled in the art. In order to provide this differentiation (or clipping) a differentiating circuit comprising resistors $R_1$, $R_2$ and capacitors $C_1$, $C_2$ and having a differential time constant of from 0.5 to 5 μs. or a magnetic delay line having a time delay of the same order is usually employed. When the pulses are subjected to one differential operation, monopolar pulses are produced, whereas when they are subjected to two differential operations, dipolar pulses are produced. When they are subjected more than three times to differential operations, spurious pulses which cannot be utilized as produced are obtained. Also, for the integrating circuits, those having substantially the same time constant or smaller time constant than the differentiating circuit can be used, whereby it is made possible to reduce the frequency band width and hence to reduce noise.

Since it has been necessary to use high gain amplifiers for said pulse amplifiers, A-C coupling amplifiers have been used which operate to amplify only the neighborhood of the required band width. However, with A-C coupling, the D-C level is automatically determined in a manner such that the mean values of electric quantities on the positive and negative sides of the input pulse are always equal. For this reason, where the output varies irregularly with time as in the case of detecting radiation, said D-C level always varies when the rate of counting is high, thus precluding exact pulse height analysis. In order to eliminate this difficulty, it is desirable to perform said clipping operation twice as shown in FIG. 6 to provide bi-polar pulses so as to equalize the positive and negative electric quantities of each pulse, and thereby to prevent variation in the D-C level. However, when electromagnetic delay lines are used, owing to difficulties in adjusting the reflection in these delay lines, it is quite difficult to completely eliminate variations in the D-C level and spurious pulse. Consequently, while large pulses and small pulses are co-existent, smaller pulses will not be corrected and hence will cause undesirable effects. For this reason, it is advantageous to utilize differentiating circuits comprising resistors and capacitors.

Even with these minute precautions, the presence of a non-linear element in a coupling circuit between a clipping circuit and a pulse height analyzer circuit will result in a difference between the positive and negative electric quantities, thus nullifying the above described function. For this reason, it is advisable to provide a second stage circuit just before the pulse height analyzing circuit, but, actually, there still remains such problems as decrease in crest value and increase in impedance. Although non-linearity of amplifiers may be improved by providing a negative feedback, if A-C amplifiers are used, no negative feedback will be provided at D-C or low frequencies, so that the D-C potential level will vary due to charging of coupling capacitors utilized in A-C amplifiers.

Figure 1:
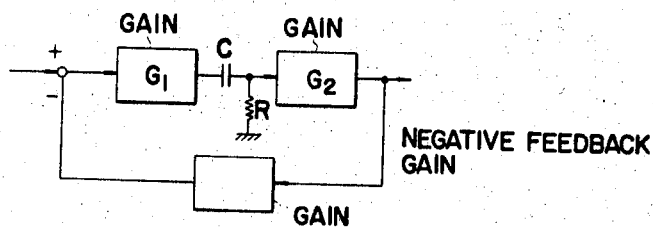
FIG. 1 shows a block diagram of a pulse amplifier with negative feedback loop.
Figure 2:
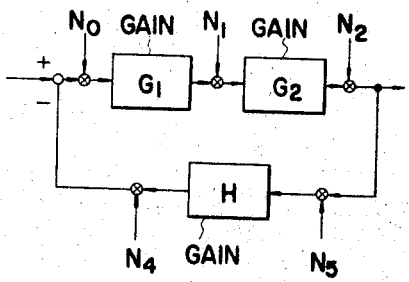
FIG. 2 shows a block diagram useful for explaining the fluctuation in D-C levels of the pulse amplifier shown in FIG. 1.

FIG. 1 illustrates an example of the circuit construction of a pulse amplifier with negative feedback, wherein a gain H of the negative feedback element and gains $G_1$ and $G_2$ of amplifier elements are provided and an A-C coupling means consisting of a resistor R and a capacitor C is included in some portion of the negative feedback loop. With this circuit arrangement, even when the input pulse is clipped twice as above described, if the pulse is distorted when it passes through the A-C coupling, the D-C level will be varied by this distortion. By denoting the variation in the D-C level due to capacitor charging by $N_i(i=0\sim4)$ and by considering all possible points of input, one can obtain a circuit as shown in FIG. 2.

In this figure $G_1$ and $G_2$ designate the gains of amplifier elements, and H the gain of the negative feedback element. As is well known, when said variations are reduced to the input side, $N_0$ and $N_4$ are not changed, $N_3$ is multiplied by H and $N_1$ and $N_2$ are reduced to $1/G_1$ and $1/G_1G_2$, respectively. Thus, it will be noted that the magnitudes of these variables decrease in the order of $N_0$, $N_4$, $N_3$, $N_2$ and $N_1$. The effects caused by $N_0$, $N_4$ and $N_3$ can be readily avoided by providing a D-C coupling between the pulse amplifiers. The effects of $N_1$ and $N_2$ are unavoidable in the case of special precise measurement as in this invention unless the gains $G_1$ and $G_2$ are made very large.

Figure 3:
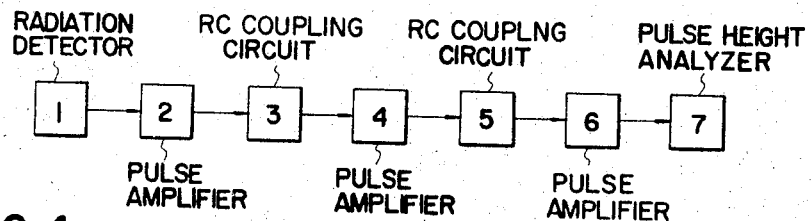
FIG. 3 is a block diagram of one example of this invention.

Referring now to FIG. 3, 1 designates a radiation detector, 2 and 4 pulse amplifiers, 3 and 5 RC coupling circuits, and 7 a pulse height analyzer; and, according to this invention, the circuit 5 and the pulse height analyzer 7 are interconnected by a pulse amplifier 6 which is constructed as follows.

It is an object of this invention to provide a circuit arrangement for use in radiation measurement and the like purpose, which is characterized in that the pulse amplifier 6 is connected to the clipping circuit of the second stage or to the input stage of a pulse height analyzer circuit or between these circuits contains a plurality of D-C amplifying active elements connected so as to obtain a product of gains greater than unity in the forward loop between both ends of the main feedback loop thereof.

Figure 4:
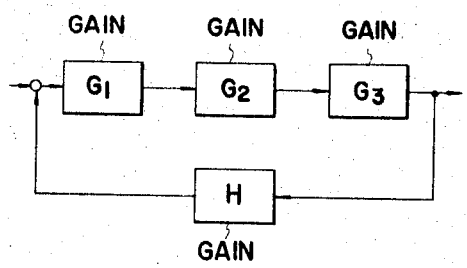
FIG. 4 is a block diagram of one main portion of the embodiment shown in FIG. 3.
Figure 5:
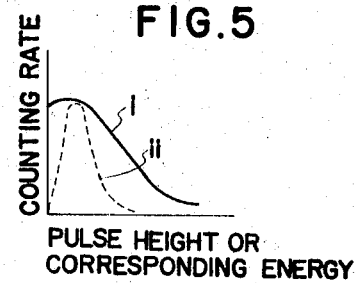
FIG. 5 is a graph representing the pulse height analysis characteristics of the circuit arrangement of this invention.

Thus, for example, in the circuit arrangement shown in FIG. 3, the RC coupling circuit 5 and the pulse height analyzer 7 are coupled together by the pulse amplifier 6 having more than two amplifying active elements ($G_1$, $G_2$, $G_3$) and the path from the input of the gain $G_1$ to the output of the gain $G_2$ has a gain substantially greater than unity and no reactance element, as shown in FIG. 4. It will be understood that this amplifier may include a cathode follower in its input stage.

A still further object of this invention is to provide a circuit arrangement for use in radiation measurement characterized in that an amplifier which does not contain any reactance element in the negative fedback loop is included in an RC coupling circuit of the second stage or pulse height analyzer circuit or between these circuits. Thus, for example, in the example shown in FIG. 3, the circuit 5 and the pulse height analyzer 7 are coupled together through a D-C amplifier 6, a cathode follower, or the like having no A-C coupling in the negative feedback loop which are used as the pulse amplifier as described above. In circuit arrangements constructed to attain said first or second objects, the combination of said amplifier and the RC coupling circuit of the second stage or the input stage of the pulse height analyzer may be constructed as a unit, and a unit comprising the former combination may be directly coupled to a rate meter, or a unit comprising the latter combination may be coupled to the output of the first stage clipping amplifier. Thus, such a unit can be advantageously utilized in various applications.

By the circuit arrangement of this invention, in the analysis of soft X-rays of the order of 10–100 A. by means of nondispersive spectrum analysis utilizing a proportional counter, it becomes possible to analyze the desired characteristic X-rays of low energy in the presence of general X-rays of high energy. When employing this circuit arrangement, even such low energy radiations (for example, the characteristic X-ray of an element having lower atomic number than carbon) which does not exhibit a peak in the spectrum can be clearly determined as a distinct peak wave II as shown in FIG. 3.

While the invention has ben described in terms of some preferred embodiments, it will be understood that many changes and modifications may be made therein without departing from the true spirit and scope of the invention as defined in the appended claims.

What I claim is:

1. A circuit arrangement for use in radiation measurement and the like comprising: a radiation detector; a first pulse amplifier to amplify the output pulses of said detector; a first RC coupling circuit to clip the output of said first amplifier; a second pulse amplifier to amplify the outputs of said first RC coupling circuit; a second RC coupling circuit to clip the output of said second pulse amplifier; a third amplifier to amplify the output of said second RC coupling circuit which contains a plurality of two D-C amplifying active elements connected to obtain a product of gains greater than unity in the forward loop between both ends of the main feedback loop thereof; and a pulse height analyzer to analyze the height of the output from said third amplifier.

2. A circuit arrangement for use in radiation measurement and the like comprising: a radiation detector; a first pulse amplifier to amplify the output pulses of said detector; a first RC coupling circuit to clip the output of said first pulse amplifier; a second pulse amplifier to amplify the output pulses of said first RC coupling circuit; a second RC coupling circuit to clip the output of said second pulse amplifier; a third amplifier to amplify the output of said second RC coupling circuit; and a pulse height analyzer to analyze the height of the output of said third amplifier, said third amplifier including a main fedback loop composed of only a D-C coupling arrangement.

References Cited

UNITED STATES PATENTS

| | | | |
|---|---|---|---|
| 3,129,329 | 4/1964 | Love et al. | 250—83.1 |
| 3,277,299 | 10/1966 | Roach et al. | 250—83.3 X |
| 2,231,374 | 2/1941 | Stillwell | 330—177 X |
| 2,579,345 | 12/1951 | Sziklai | 330—177 X |
| 2,659,823 | 11/1953 | Vossberg | 250—88.3 X |
| 2,779,875 | 1/1957 | Borkowski et al. | 250—83.3 |
| 2,859,344 | 11/1958 | Imm | 328—54 |
| 2,985,836 | 5/1961 | Halton | 328—54 |

ARCHIE R. BORCHELT, *Primary Examiner.*

U.S. Cl. X.R.

250—83.1